United States Patent [19]

Brown et al.

[11] 4,012,745

[45] Mar. 15, 1977

[54] PHASE CORRECTION SYSTEM

[75] Inventors: Michael K. Brown, Tecumseh; David E. Lundquist, Birmingham; Leonard P. Bullis, Dearborn; Arvin D. McGregor, Birmingham, all of Mich.

[73] Assignee: Burroughs Corporation, Detroit, Mich.

[22] Filed: Nov. 28, 1975

[21] Appl. No.: 636,024

[52] U.S. Cl. .................................... 346/1; 346/75

[51] Int. Cl.[2] .................................... G01D 18/00

[58] Field of Search .................................... 346/75, 1

[56] References Cited

UNITED STATES PATENTS

| | | | |
|---|---|---|---|
| 3,596,276 | 7/1971 | Lovelady | 346/75 X |
| 3,769,630 | 10/1973 | Hill et al. | 346/75 |
| 3,769,632 | 10/1973 | Jolisburger et al. | 346/75 |
| 3,898,673 | 8/1975 | Haskell | 346/75 X |

*Primary Examiner*—Joseph W. Hartary
*Attorney, Agent, or Firm*—Robert C. J. Tuttle; Ronald L. Taylor; Carl Fissell, Jr.

[57] ABSTRACT

An improved system for determining the optimal phase time to charge a liquid stream emitted from a jet as it evolves in form from a continuum to a separatuum of droplets wherein the optimal time for achieving the desired level of charge on a given droplet may be had by applying the charge immediately prior to break-off of droplets. A particular use of the system is in an ink jet droplet apparatus having a controlled liquid stream of ink that is separated into droplets by a sonic transducer and then charged by a pair of charging plates in a dynamically controlled manner at an optimal phase time as correctably tested by the system for subsequent static deflection of the charged droplets to a desired portion of a document to form printed characters.

36 Claims, 8 Drawing Figures

RECEIVER PORTION OF THE PHASE CORRECTION SYSTEM 390
RECEIVER PHASE STORE & COMPARE CIRCUIT 210
RECEIVER LOAD & CLEAR CIRCUIT 255
RECEIVER PHASE COUNTER & SELECTOR CIRCUIT 170
A / D
FIRST REGISTER PHASE STORE
SECOND REGISTER MAX-PHASE STORE
COMP. 235
FF
RECEIVER PHASE SELECTOR 300
THIRD REGISTER MAX-COUNT STORE 290
PHASE COUNTER 650
DECADE COUNTER 640
BINARY COUNTER 625
FF 615

PHASE CORRECTION SYSTEM

CROSS REFERENCE TO A RELATED PATENT

A patent entitled "Liquid Jet Droplet Generator" bearing Ser. No. 577,667, filed May 15, 1975 to David E. Lundquist et al and assigned to the Burroughs Corporation describes and claims an ink jet droplet apparatus upon which the present invention is an improvement.

BACKGROUND OF THE INVENTION

1. Field of the Invention

This invention relates to an ink jet droplet apparatus having a generator for charging ink droplets formed from a liquid stream by a sonic transducer for use in non-impact printing and more particularly to a phase correction system associated with the apparatus for optimally determining during a test period the phase time associated with the operation of the charging generator and the sonic transducer.

2. Prior Art

It is a characteristic of an ink jet droplet apparatus used for document printing that the point of break-off where the ink stream separates into droplets may temporally vary within any given time frame relative to the initialization of a sonic transducer which induces droplet break-off. This is a result of the acoustic characteristics of the ink, and in particular, the pressure of the ink stream as it is emitted from its jet source in the apparatus and the viscosity of the ink. The viscosity, in turn, is dependent upon the ink temperature, and the solvent content of the ink. These viscosity dependencies will vary through time and thus affect the temporal position of the break-off point relative to the sonic transducer at charging time. Since the plates for charging the droplets are spatially and temporally fixed relative to the sonic transducer, any temporal variance of the break-off point through time will cause suboptimal charging of the droplets. At relatively low printing speeds, such temporal variance could be tolerated within certain limits since printing precision would not be critically affected. Alternatively at a trade off in higher cost, variance in the viscosity dependencies could be lowered or eliminated by strictly controlling the ink environment. Where higher printing speeds are desired without resorting to a relatively high cost ink environment new solutions are then required to overcome the supra problems.

SUMMARY OF THE INVENTION

Accordingly, it is an object of the invention to provide an improved means for optimizing the droplet charging time in an ink jet droplet generator.

It is another object of the invention to provide a means for calibrating the charging time of ink droplets when the droplet break-off point may temporally vary relative to a spatially fixed charging point.

Yet another object of the invention is to provide a means for temporally varying the electrical initializing of charging relative to the fixed temporal initializing of sonic transducing.

Another object of the invention is to provide a time phase correction that may temporally vary the charging initializing to compensate for a droplet breakpoint that may vary through time due to changes in the viscosity of the droplet itself or for other associated reasons.

A final object of the invention is to provide a phase correction circuit having transmitter and receiver portions operative to select from a plurality of electronic phase times the phase time that will optimally correct for temporal changes in the droplet break-off point through time.

In carrying out these and other objects, the present invention contemplates a prior art ink jet droplet apparatus particularly adapted for non-impact printing which employs directed ink droplets for deposit upon a document to be printed. The prior art apparatus comprises a sonic transducer strobed by a master clock, an ink jet mechanism for receiving ink and outputting said ink in a controlled stream which may be broken off into droplets by the vibrations from the sonic transducer at a predetermined distance therefrom, a pair of charging plates for charging with dynamic control the droplets immediately prior to break-off as controlled by a print logic circuit strobed by the master clock, a pair of deflection plates for statically guiding the charged droplets as also controlled by the print logic circuit strobed by the master clock, an ink droplet catcher for receiving unused ink droplets, and a document to be printed that moves in a direction transverse to the locus of charged droplets. The inventive improvement to the prior art apparatus comprises a phase correction circuit strobed separately by a plurality of subdivisions or phase times of the master clock signal. When the system is triggered into its test period by the print logic circuit, it will test the point in time at which a droplet forms or breaks off when proximate to the charging plates after the sonic transducer has emitted a periodic vibration. Once the optimal phase time has been determined as between the initializing of the sonic transducer and the charging plates, this optimal phase time will be used to correct charging initialization by acting through the print logic circuit to temporally control the charging plates during the subsequent print period and until the beginning of the next test period whereupon the test will be repeated.

BRIEF DESCRIPTION OF THE DRAWINGS

Various other objects, advantages and meritorious features of the invention will become more fully apparent from the following specification, appended claims and accompanying drawing sheets wherein:

DESCRIPTION OF THE PRIOR ART

Figure 1:
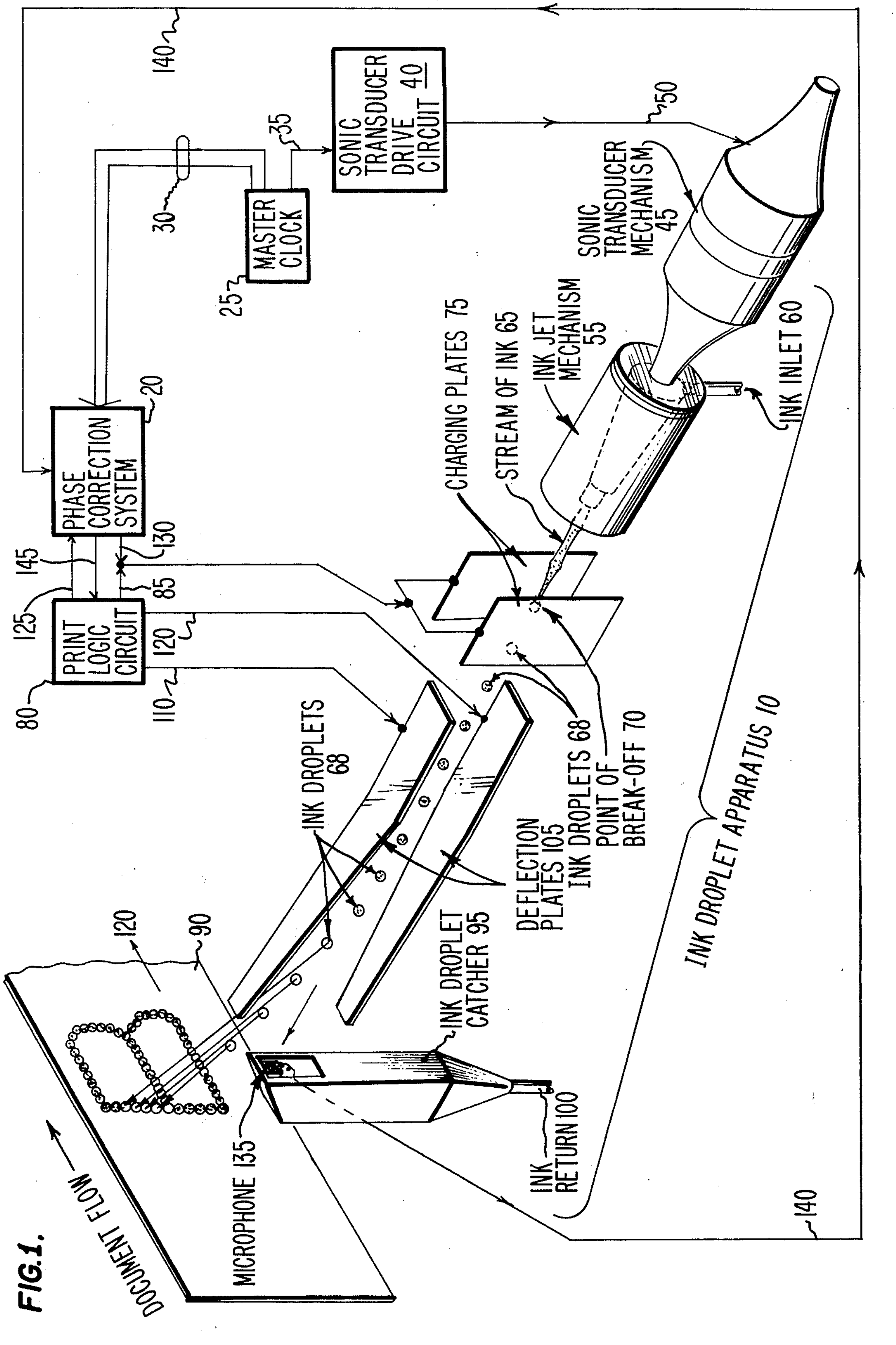
FIG. 1 is a schematic representation of a prior art ink jet droplet apparatus and an associated inventive phase correction system constituting the improvement thereof.

Referring to FIG. 1, there is illustrated the prior art liquid jet droplet generator hereinafter referred to as the ink jet droplet apparatus 10 as disclosed in the referenced Ser. No. 577,667, and also the associated inventive phase correction system 20 constituting the improvement which cooperatively acts with the apparatus 10.

A master clock 25 acts to strobe the entire apparatus 10 at a master signal of 250 Kc to 253 Kc but preferably 250 Kc or a period of 4 us on line 35. The master clock 25 additionally will output a relatively narrow divide-by-ten signal of the master signal serially every 400 ns to 600 ns but preferably 400 ns on collective lines 30 which each of the ten signals hereinafter referred to as phase time signals ($\phi 1$ through $\phi 10$) is each outputted on a unique line. It will be noted that the phase time signals on collective lines 30 each having a period of 400 ns will follow each other serially each on its own unique line as indicated infra.

In the prior art apparatus 10, the master clock's 25 master signal on line 35 inputs to drive circuitry 40 for a sonic transducer 45 which in turn causes, through line 50, the transducer 45 which may be sonic to vibrate at sonic or ultrasonic frequencies. An ink jet mechanism 55 receives ink from an ink inlet 60 from a pump (not shown) and outputs it in a controlled liquid stream 65. The liquid stream of ink 65 is acted on by the vibrations from the sonic transducer 45 to break-off into droplets 68 at a point 70 in the proximate vicinity of one or a pair of charging plates 75. The charging plates 75 have a potential applied to them whenever it is desired to charge the droplets 68 as they are formed. Such charging will be performed whenever a test or print period is operative as will be seen infra.

The charging plates 75 receive their potential from the print logic circuit 80 on line 85 during a print period wherein the print logic circuit 80 is derivately strobed by the collective lines 30 from the master clock 25 as will be seen infra. Ideally the droplets 68 will be charged as they are forming, that is, immediately prior to break-off 70 from the liquid stream 65 since that is the time when maximum and thus optimal ionization of the droplet 68 may most easily be had. Once the droplets 68 are formed, they proceed in the general direction of the document 90 to be printed. If the droplets have not been charged, they will move directly in line to an ink droplet catcher 95 which will receive the ink droplets 68 and funnel them through an ink return 100 to an ink reservoir (not shown). In a print period, the droplets 68 will be dynamically charged for a set charging time of 4 us corresponding to the master clock 25 period. As alluded to earlier the initialization of the 4 us charging time will depend on the optimal phase time selected in the test period. The dynamic charge placed on the droplets 68 by the charging plates 75 is controlled by the print logic circuit 80 and will vary the amplitude of the dynamic charge anywhere from 125 to 350 volts depending on the desired vertical position to be encoded on the document 90 by the droplet 68. The static deflection plates 105 will deflect the droplet 68 according to the dynamic charge on the droplet 68. The static potential is derived through lines 110, 120 from the print logic circuit 80. The deflection plates 105 will thus redirect up or down the flight of the charged droplet depending on the charge placed on it by the charging plates 75 so as to target the desired area to be character printed on a document 90 which will be traveling by at that time in a direction 120 transverse to the locus of the droplets 68. The up-down deflection of the droplets 68 combined with the transverse motion of the document 90 give a complete X–Y axis coordinate system in which almost the entire surface of the document 90 may be uniquely printed as in a matrix. The mechanical portion of the above described apparatus 10 is in the prior art as mentioned supra.

In FIG. 1, there is shown the phase correction system 20 in block form constituting the improvement of the present invention. In the present embodiment, it is assumed that due to environmental changes in the viscosity of the ink used or other associated reasons, as explained supra, the break-off point 70 may temporally occur earlier or later through time than originally programmed. As such, there exists a need to recalibrate the apparatus 10 periodically so that the apparatus 10 may follow these changes by correctably calibrating itself to them and thus not suffer any appreciable loss of print quality through time. Apparatus 10 is made to correct itself by recalculating the time phase as between the initiating of the temporally constant sonic transducer 45 and subsequently the temporally adjustable charging plates 75. The phase correction system 20 is interposed into the apparatus 10 to perform this function as will be described infra.

The phase correction system 20 is disposed to be operative during a test period comprising the time between endorsements or print periods. The test period is triggered by a start signal on line 125 from the print logic circuit 80 which may be triggered in turn by the leading edge of a document 90 detected interrupting a beam of light (not shown). Once the test period is operative, the phase correction system 20 will select each of the ten phase time signals in turn from collective lines 30 and test them by separately outputting them on line 130 to the charging plates 75 to attempt to charge the droplets 68 with a fixed 120 v. charge as they are forming. It will be noted that the ten phase time signals are mutually exclusive and represent all the successive possible increments of time as between droplets, that is, droplet to droplet in the time frame wherein there is the highest probability that they will be formed. Thus each phase time will be tested until one is found that temporally corresponds most nearly to that time of droplet formation immediately prior to break-off at point 70 from the liquid stream 65. It should be realized that several of the phase times may charge the droplets 68 to a degree and as such only the phase time which relatively charges the droplet 68 to the highest degree will be chosen as the optimal or maximum phase time.

Obviously some means of feeding back information during a test period on how well a charge took on a droplet 68 is needed. This function is performed by a microphone (MIC) 135 that sits just inside the mouth of the ink droplet catcher 95 and slightly above the uncharged droplet 68 line of travel as shown in FIG. 1. The print logic circuit 80 will attempt to place a 120 v. amplitude charge on a droplet 68 to be tested for a particular phase time which will result in the charged droplet 68 being deflected by plates 105 to the MIC 135 and which should hit the MIC 135 close to center if fully charged indicating an optimal phase time and thus cause a maximum signal to be outputted by the MIC 135 on line 140 based on the predetermined deflection potential required for a fully charged droplet 68 to reach that targeted area on the MIC 135. The signal indicative of a hit on line 140 from the MIC 135 is sent to the phase correction system 20 where it is analyzed as to how its intensity compared to the previous phase time signals tested. Once all ten of the phase time signals on collective lines 30 have been tested, the one optimal or maximum phase time signal representing the best hit on the MIC 135 will be sent on line 145 to the print logic circuit 80 to be used as the clock derivative mentioned supra from the master clock 25 for charging the plates 75 on line 85 during the subsequent print period. That is, the phase time used by the print logic circuit 80 to set the leading edge of the 4 us charge represents optimal charging at the center of the 4 us charge. At the end of the print period, the process again repeats itself and thus the apparatus 10 is phase corrected or calibrated before every print period thereby guaranteeing a high standard of print quality through time even in a changing ink environment.

Figure 2:
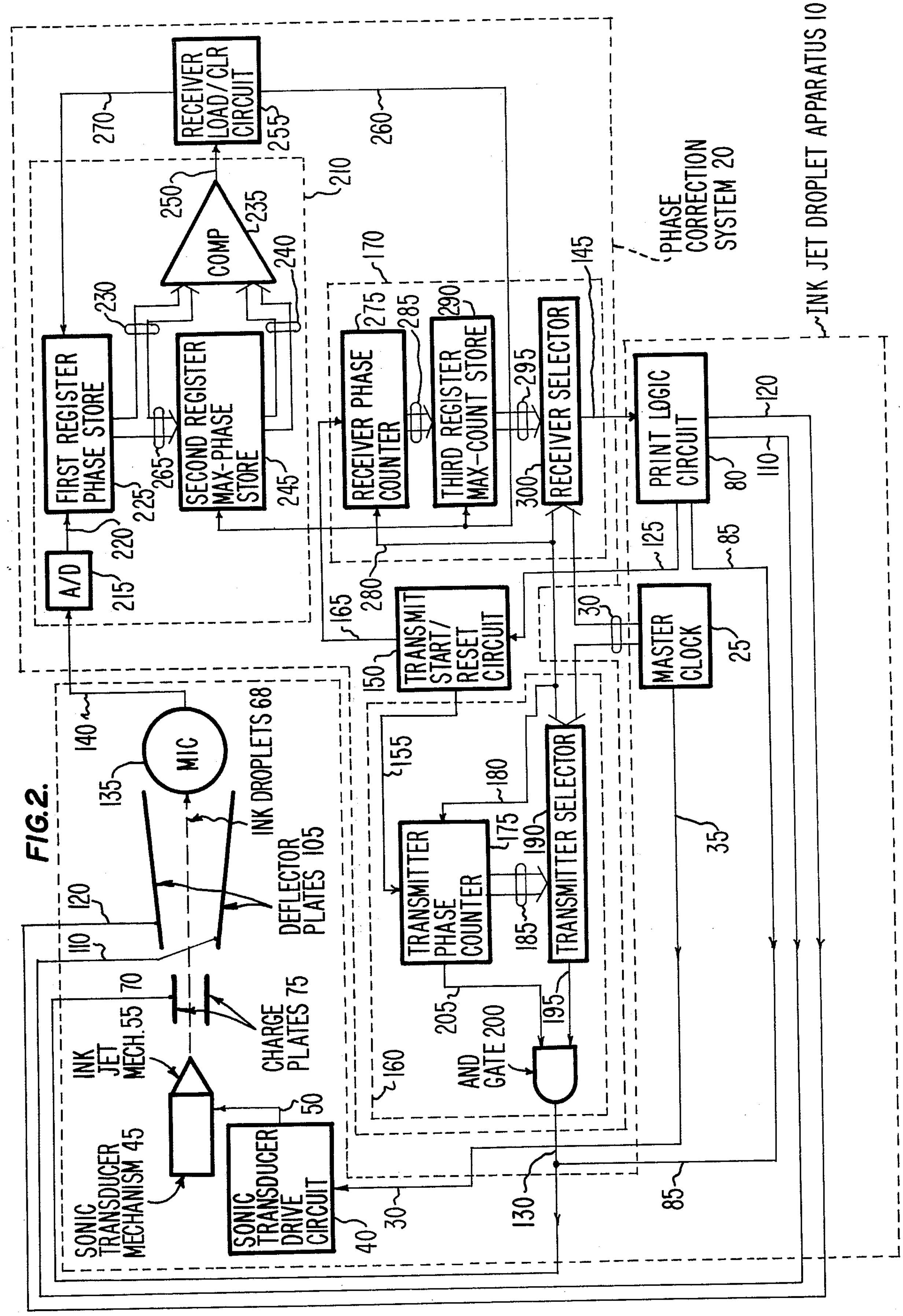
FIG. 2 is a block diagram of the improved phase correction system shown in FIG. 1 embodying the present invention.

In FIG. 2, the phase correction system 20 is further blocked out in more detail to show its operation during a test period. To enable a test period between print periods, a start signal will be sent from the print logic circuit 80 on line 125 as mentioned supra to a transmit start/reset circuit 150 in the phase correction system 20. This circuit 150 in turn sends a control enabling signal on line 155 to a transmitter phase counter and selector circuit 160 and additionally sends a delayed control enabling signal on line 165 to a receiver phase counter and selector circuit 170. The control enabling signal on line 165 is delayed 1.4 ms to compensate for the delay incurred while the charged droplet 68 is traveling through space from the charging plates 75 to the MIC 135. This allows the transmitter portions of the phase correction circuit 20 to be synchronizably enabled relative to receiver portions.

Once enabled by the control enabling signal on line 155, a transmitter phase counter 175 will be receptive to be triggered by the first phase time sigal ($\phi$1) on line 180 as obtained from collective lines 30 of phase time signals. As the transmitter phase counter 175 begins to count, it will send coded selection signals on collective lines 185 to a transmitter phase selector 190. The transmitter selector 190 upon receipt of the phase time signals on collective lines 30 will, by use of the coded selection signals on collective lines 185, begin to select each phase time signal in turn to be tested and send them serially on line 195 to an AND gate 200. The transmitter phase counter 175 will additionally output a control signal on line 205 to the AND gate 200 that will have the analogous effect of modulating the selected phase time signal on line 195 for better MIC 135 reception when it is outputted by AND gate 200 on line 130 as will be seen infra.

As described before, the signal on line 130 charges the plates 75 which in turn charges droplets 68 before they travel through space to MIC 135 to be further tested. The signal on MIC 135 is carried by line 140 to a receiver phase store and compare circuit 210 in the phase correction system 20 and in particular to an analog-digital (A/D) device 215 that will digitize the analog signal from the MIC 135. The particular A/D device 215 may be any of a number of the commercially used models as is well known in the art. The digitized signal on line 220 is sent to a first register phase store 225 which counts and holds the digitized signal representative of the quality of the current phase time being tested. Once the current digitized phase time signal is so stored, a coded representation thereof is outputted on collective lines 230 to be compared on a comparator (COMP) 235 with the previous maximum phase time signal on collective line 240 emanating from and stored in a second register maximum phase store 245. The results of the comparison are sent on line 250 to a receiver load/clear (CLR) circuit 255 in the phase correction system 20. If the receiver LOAD/CLR circuit 255 interprets the compare as indicating that the value in the first register phase store 225 is greater than that in the second register maximum phase store 245, then a load control signal on line 260 is sent to the second register 245 to enable it to receive a signal on collective lines 265 from the first register 225 thereby placing the value in the first register 225 in the second register 245. If, on the other hand, the value in the second register 245 was greater than the value in the first register 225, then the first register 225 would be cleared by a clear signal on line 270 and thus be able to receive the subsequent phase time signals for testing.

Upon being enabled by the delayed control signal on line 165, the receiver phase counter 275 of the receiver phase counter and select circuit 170 will be operative to be incrementally triggered by the first phase time on line 280 of every master clock signal to give an indication of the current phase time being tested as outputted in coded form on collective lines 285 to a third register maximum count store 290. The third register 290 will only accept the signal on collective lines 285 when it concurrently receives a load signal on line 260 indicating that compare circuit 235 has found the current phase time signal to be the maximum to date in that test period. Whatever is stored in the third register 290 will always be outputted in coded form on collective lines 295 to a receiver phase selector 300. The receiver selector 300 will use the current coded signal on collective lines 295 to select that phase time signal on line 30 which is a representation of an output on line 145 to the print logic circuit 80. Thus at the end of the test period after all phase time signals have been tested, only the true maximum or optimum of all phase time signals for that test period will still be outputted by the receiver selector 300 to the print logic circuit 80. Thus an accurate indication of the phase time needed as between the charging plates 75 and sonic transducer 45 initialization will be available for the subsequent print period.

Figure 8:
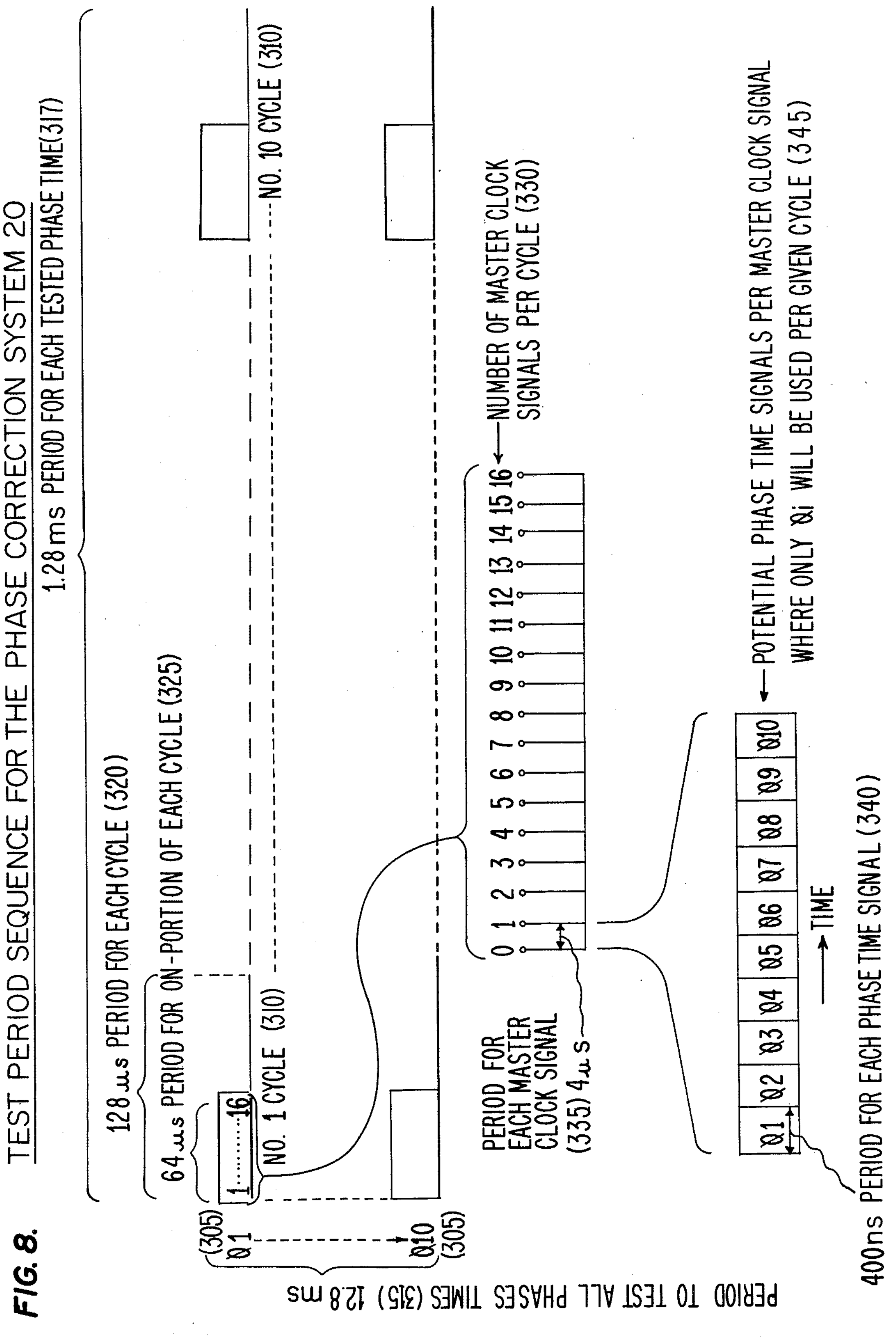
FIG. 8 is a timing diagram representative of the signals used in the operation of the test period sequence for the phase correction system of FIG. 2.

Referring now to the schematic diagrams of FIGS. 3 through 7 and the timing diagram of FIG. 8, a more detailed description of the phase correction system will be given. Turning first to FIG. 8, the timing diagram, it will be seen that each of the phase times ($\phi$1 through $\phi$10) (305) are each in turn tested ten times or cycles (310). It takes a 12.8 ms period (315) to test all phase times, a 1.28 ms period to test all cycles of a given phase time (317), a 128 us period (320) to test each cycle of a given phase time, and 64 us period to complete the on-portion of a given 128 us cycle (325). The on-portion (325) of 64 us constitutes the modulation signal on line 205 mentioned supra. Each of the on-portions (325) is comprised of 16 master clock signals (330) of 4 us each (335). More correctly, only one of a given phase time signal $\phi_i$ of 400 ns (340) is actually existant or used within the 4 us time frame represented by the master clock. That is, as each phase 305 is tested in turn, all cycles within that phase will only use one phase time ($\phi_i$) for 64 us for each cycle for a given phase being tested due to the response period of the MIC 135. The MIC 135 response is approximately 8 Kc that is 64 us. Thus the 250 Kc or 4 us master clock 25 has had its frequency effectually modulated down to 8 Kc. This gives a more consistent result within a cycle and also through all the cycles for a given phase since anomalies in the ink environment may aberrate any one attempt to charge a droplet or even a series of attempts as in a cycle. As such the receiver portion 210 will be designed not to pick up anything smaller than a cycle and the series of cycles making up an optimal phase time should be significantly better than the next best phase time due to the averaging of the test over ten cycles for any given phase time.

Figures 3, 4:
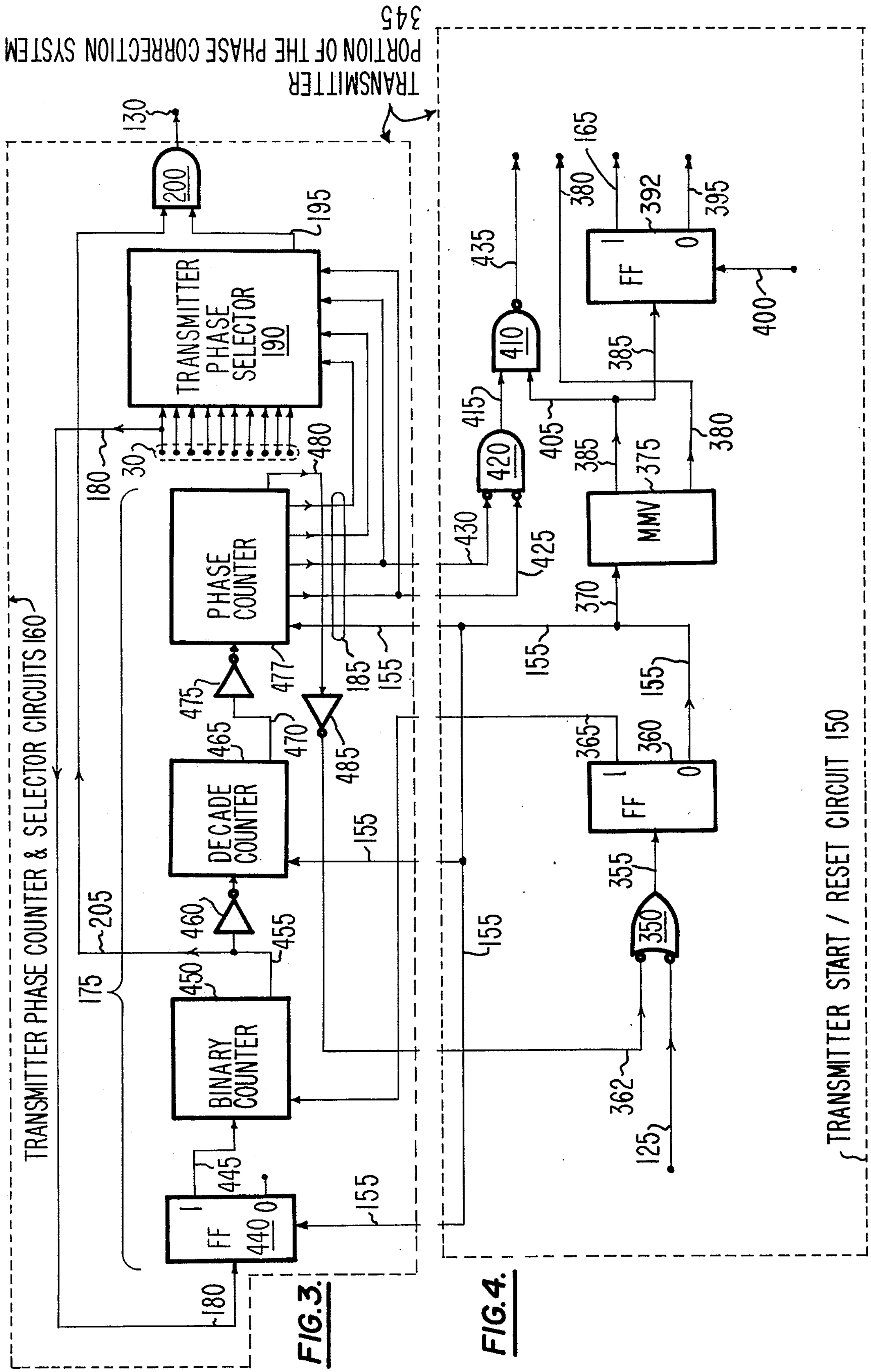
FIG. 3 is a schematic diagram of the transmitter phase counter and selector circuits of FIG. 2.
FIG. 4 is a schematic diagram of the transmitter start/reset circuit of FIG. 2.

In the transmitter portion 345 of the phase correction system 20 comprising the detailed schematic diagrams embodied in FIG. 3 and FIG. 4 and in particular in FIG. 4 having the transmit start/reset circuit 150, the test period may be initiated by a start signal on line 125 from the print logic circuit 80 as mentioned supra. The start signal on line 125 is sent to a NOR gate 350 with negated inputs and then carried on line 355 to a trigger point of flip-flop 360. NOR gate 350 may also be enabled at the end of the test period by a signal on line 362 from counter 477 through inverter 485 as described infra. During a print period the flip-flop 360 will be set to its high (1) output, to output on line 365, but at the initiation of a test period, the start signal will trigger flip-flop 360 to its low (0) side to output on line 155 to reset and start the counter 175 incrementing as mentioned supra, and will remain there to the end of the test period. When flip-flop 360 is set low, the signal on line 155 will bifurcate to line 370 to trigger a monostable multivibrator (MMV) 375 having a period of 1.4 ms. The preferred MMV 375 is a TI 74121. The MMV 375 "on" pulse is outputted on line 380 for initializing purposes in the receiver portion 390 described infra and its "off" pulse on line 385 is used for purposes to be described infra. The purpose of the delay period as mentioned supra is to start the receiver portion 390 of the phase correction system 20 1.4 ms after the transmitter portion 345 so as to compensate for the period it takes for the relatively slow charged droplet 68 to travel through space from the charging plates 75 to the MIC 135. After the MMV 375 has timed out in the test period, an "off" signal on the line 385 will trigger a flip-flop 392 out of its low (0) outputting state on line 395 to its high (1) outputting state on line 165 marking the delayed reset and start initiation of the test period to the receiver phase counter 275 as mentioned supra. At the end of the test period, a signal on line 400 from the receiver phase counter and selector circuit 170 mentioned supra will reset the flip-flop 392 back to its low state to again output on line 395. Bifurcating from line 385 is a line 405 inputting to a NAND gate 410. Also inputting to NAND gate 410 is line 415 from NAND gate 420 having negated inputs. As will be seen infra, NAND gate 420 will output upon receiving concurrent signals on lines 425 and 430 from the transmitter phase counter 175 indicating that the test period has only just started or has not tested beyond the second phase time ($\phi i \leq 2$) as will be seen infra. Thus when ($\phi i \leq 2$) and MMV 375 is "off", gates 420 and 410 will be true, and a signal on line 435 will be outputted for initializing purposes to the receiver portion 390 as described infra.

In FIG. 3, the transmitter phase counter and selector circuit 160 is clocked by the first phase time signal ($\phi_i$) on line 180 as derived from the collective lines 30 having all the phase times as mentioned supra. This first phase time signal having a period of 4 us on line 180 is used to continuously trigger a flip-flop 440 which by acting as a frequency divider will output from its high side (1) a signal on line 445 having a period of 8 us. The signal on line 445 is sent to clock a binary counter 450 which will in turn multiply the incoming period by a factor of 16 and thus output a signal on line 455 having a period of 128 us. The preferred binary counter 450 is a TI 7493. The signal on line 455 is sent through an inverter 460 to clock a decade counter 465 which will multiply the incoming period by a factor of ten to thus output a signal on line 470 having a period of 1.28 ms. The preferred decade counter 465 is a TI 74160. This signal on line 470 is inverted 475 and sent to clock a phase counter 477 where again the incoming signal's period is multiplied by a factor of ten thus giving an output signal on line 480 having a period of 12.8 ms. The preferred phase counter is a TI 74160. The flip-flop 440, the binary counter 450, the decade counter 465, and the phase counter 477 collectively constitute the transmitter phase counter 175 mentioned supra. At the beginning of the test period, the flip-flop 440, the decade counter 465 and the phase counter 477 are reset to zero by flip-flop's 360 low side on line 155. At the end of the test period, the binary counter 450 is reset to zero by the flip flop's 360 high side on line 365. The output of the phase counter 477 on line 480 through inverter 485 and out on line 362 is representative of the serial output of the final stage thereof and is used to reset the flip-flop 360 to its high state at the end of the test period.

The phase counter 477 parallel outputs on collective lines 185 are outputted to the transmitter phase selector 190 to codably select a particular phase time to be tested from the collective lines 30 also being inputted to the selector 190. The preferred phase selector 190 is a TI 74150. The selected signal from the phase selector 190 is outputted on line 195 to the AND gate 200. Output line 455 from the binary counter 450 is bifurcated to give the line 205 which is also inputted to the AND gate 200. Upon concurrent receipt to its inputs, AND gate 200 will output on line 130 to the charging plates 75 in order to charge a selected droplet 68 for a given phase time being tested.

Relating the supra described FIG. 8 to the just described FIG. 3, the 4 us signal 335 in FIG. 8 indicating a new master clock signal corresponds to the signal on line 180 in FIG. 3. The 128 us signal 320 in FIG. 8 indicating a new cycle corresponds to the signal on line 455 from the binary counter 450 in FIG. 3. The 1.28 ms signal 317 in FIG. 8 indicating the completed test of all cycles for a phase time corresponds to the signal on line 470 from the decade counter 465 in FIG. 3. The 12.8 ms signal 315 in FIG. 8 indicating that all phase times have been tested and thus the end of a test period haas been reached corresponds to the signal on line 480 from the phase counter 477 in FIG. 3. The 128 us signal on line 205 in FIG. 3 is actually only the "on" portion of 64 us as shown in FIG. 8 at 325 which will be used by gate 200 to modulate the selected phase time signals where all are of the same phase time on line 195 as mentioned supra so that sixteen phase time signals will be gated "on" per 64 us modulations. Since 128 us is equivalent to 8 Kc, the response frequency of the MIC 135, then to the MIC 135, the sixteen phase time signals per cycle having a period of 64 us will be seen as one pulse to the MIC 135.

Figures 5, 6, 7:
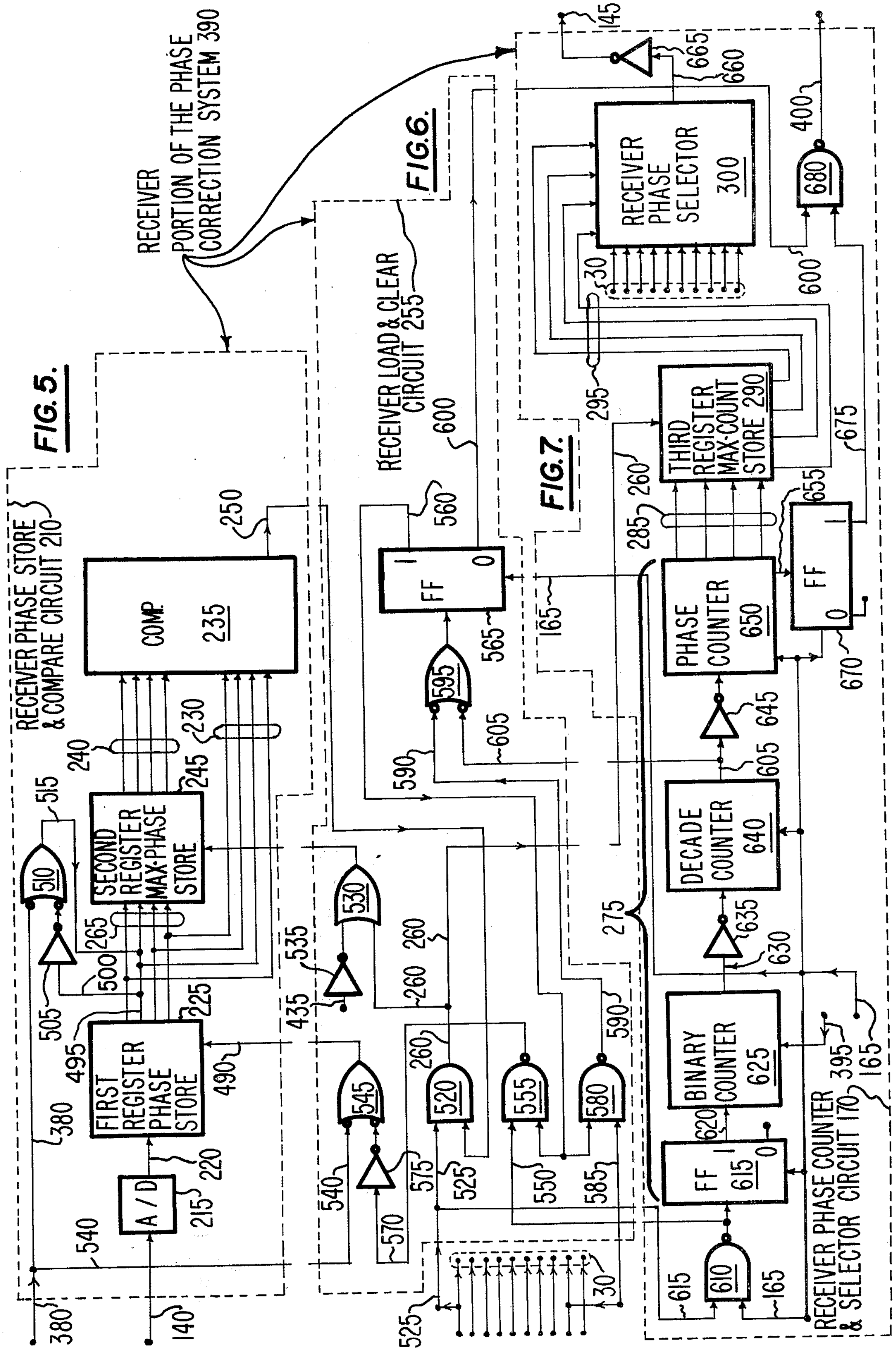
FIG. 5 is a schematic diagram of the receiver phase store and compare circuit of FIG. 2.
FIG. 6 is a schematic diagram of the receiver load/-clear circuit of FIG. 2.
FIG. 7 is a schematic diagram of the receiver phase counter and selector circuit of FIG. 2.

In the receiver portion 390 of the phase correction system 20 comprising the detailed schematic diagrams embodied in FIG. 5, FIG. 6 and FIG. 7 and in particular FIG. 5 having the receiver store and compare circuit 210, the signal having an 8 Kc rate on line 140 from the MIC 135 will be sent during a test period to the analog-to-digital converter (A/D) 215 having any one of many commonly used commercial designs as well known in the art as mentioned supra. The digitized MIC 135 signal outputted from the A/D 215 on line 220 will then be sent to clock a first register phase store 225. The preferred first register phase store 225 being a TI 7493. The store 225 is operative to be reset by signals on line 490 everytime a new phase time is to be tested as indicted by the receiver load/clear circuit 255 as will be described infra. Thus for a given phase time being tested, the store 225 will count the number of 128 us cycles as clocked from the digitized MIC 135 signal up to a maximum of ten and store that number until again reset. The store 225 will also continuously output in parallel fashion on collective lines 230 a coded representation of the currently stored number. The signals on collective lines 230 will be sent to be inputted to a comparator (COMP) 235. The preferred COMP 235 is a TI 7485. The COMP 235 will also receive signals from a second register maximum phase store 245 on collective lines 240. The preferred store 245 is a TI 7475. Whenever the signals on collective lines 230 are greater than those on lines 240, then the COMP 235 will output a signal on line 250 indicative thereof to the receiver load/clear circuit 255. The circuit 255 will then act to output a control signal on line 260 to the store 240 to enable it to accept a signal on collective lines 265 that bifurcated from lines 230. The signal as accepted by store 245 represents the new phase time having a greater number of maximum cycles than that previously stored therein and thus best fit at that point in the test to charge the droplets 68. It will be noted that line 495 of collective lines 265 is interrupted and tapped by line 500 then inverted 505 and sent to a NOR gate 510 having negated inputs and finally on line 515 back to the other side of line 495 of collective lines 265. Furthermore, line 380 additionally inputs to NOR gate 510. The signal on 380 from MMV 375 when it is on, acts at the beginning of the test period to initialize the store 245 with a value of two through line 265 to thus immunize it against incipient noise that might otherwise spuriously enable COMP 235. This does not destroy the validity of the test since it is expected that more than two cycles must increment the store 240 for a given phase time for that phase time to be selected as optimal. For the remainder of the test period, lines 500 and 515 will connect the interrupted line 495 so that it may function as it would normally or if non-interrupted.

In FIG. 6, the receiver load/clear circuit 255, when a good comparison has been made by COMP 235 indicating that store 225 is greater than store 245 thus allowing a signal to be outputted on line 250, an AND gate 520 will receive this signal on line 250. AND gate 520 will also receive a signal for synchronization on line 525 which taps signals from the tenth phase time on collective lines 30. Concurrent receipt of these inputs by AND gate 520 allows a signal to be outputted on line 260 through OR gate 530 to the store 245 which will, as mentioned supra, enable the store 245 to receive a new signal on collective lines 265. OR gate 530 is also operative to receive a signal through inverter 535 on line 435 from the "off" MMV 375 to also enable store 245 when there is a signal on line 380 at the beginning of the test period. Also at the beginning of the test period, signals on line 380 are bifurcated to line 540 and through NOR gate 545 having negated inputs to output on line 490 to provide the initial reset of the store 225. Every 4 us upon occurrence of the tenth phase time during the phase period, a signal will be received on line 550 from the receiver phase counter and selector circuit 170, as will be described infra, and sent to a NAND gate 555. Also inputted to NAND gate 555 on line 560 from the high side (1) of a flip-flop 565 will be a signal indicative of the start of a test of a new phase time in a given test period. Upon concurrent receipt of inputs at NAND gate 555, a signal will be sent on line 570 through inverter 575 to the NOR gate 545 and then to reset store 225 at the start of every new phase time. NAND gate 580 is also operative to receive an input from line 560 indicative of a new phase time and a second input on line 585 tapping the second phase time in the collective phase time lines 30. Upon concurrent receipt of inputs by gate 580, it will output on line 590 through NOR gate 595 having negated inputs to triggerably reset flip-flop 565 to its low (0) state and thus output on line 600 to the receiver phase counter and selector circuit 170 as will be seen infra. Whenever the receiver phase counter 275 outputs a signal on line 605 to the NOR gate 595, indicating the start of a new phase time, the flip-flop 565 will trigger to its high state (1) again and thus output on line 560. At the beginning of a test period, the flip-flop 390 will trigger to its high side and output on line 165 to directly reset the flip-flop 565 to its low state.

In FIG. 7, the receiver phase counter and selector circuit 170 will receive through NAND gate 610, a signal indicating phase time ten for synchronizing through a line 615 bifurcated from line 525. Additionally, gate 610 will have inputted to it a signal on line 165 from the high state of flip-flop 392 indicating the beginning of a test period. Upon concurrent receipt thereof, gate 610 will output on line 550 to enable AND gate 555 as indicated supra and also by bifurcation to trigger a flip-flop 615 every 4 us, i.e., at the rate of the master clock signal. Flip-flop 615 outputs on its high side (1) with a period of 8 us on line 620 to clock a binary counter 625. The preferred counter 625 is a TI 7493. The counter 625 multiplies by a factor of 16 the period of the incoming signal to output a signal on line 630 having a period of 128 us representing the period of a given cycle per given phase time being tested. The signal on line 630 is inverted 635 and sent to a decade counter 640. The preferred decade counter 640 is a TI 74160. The counter 640 multiplies by a factor of 10 the period of the incoming signal to output a signal on line 605 having a period of 1.28 ms representative of the period it takes to test all cycles of a given phase time. The signal on line 605 is sent through NOR gate 595 to trigger flip-flop 565 to its high state indicating a new phase time to be tested as indicated supra. The signal on line 605 is also bifurcatably sent through an inverter 645 to a phase counter 650. The preferred counter 650 being a TI 74160. The counter 650 multiplies by a factor of 10 also the period of the incoming signal to output a signal in serial fashion on line 655 having a period of 12.8 ms representative of the entire test period at the time it takes to test all phase times in a given test period. The counter 650 also outputs in parallel fashion on collective lines 285 representing the current count in the phase counter 650. The signals on collective lines 285 are sent to a third register maximum count store 290, but are not received therein until a control signal on line 260 from AND gate 520 is received indicating a good compare was made, i.e. store 255 greater than store 245. The preferred store 290 is a TI 7475. Flip-flop 615, counter 625, counter 640 and counter 650 are all part of the receiver phase counter 275 described supra.

The store 290 is operative to output coded signals continuously on collective lines 295 to be received by phase selector 300. The preferred selector 300 is a TI 74150. The selector 300 is operative to continuously receive on the collective lines 30 all ten phase times in parallel fashion. The coded signals on collective lines 295 act in the selector 300 to enable whatever phase time inputted via collective lines 30 is currently optimal or maximum at any given time. This currently optimal phase time is transferred from the collective lines 30 through the selector 300 and serially out on line 660 to an inverter 665 and then on line 145 to the print logic circuit 80. It will be noted that the print logic circuit 80 will not act on a currently optimal phase time during the test period, but only on the optimal phase time at the end of the test period, that is, after all phase times have been tested for that test period. This end of test period optimal phase time will then be used during the subsequent print period after which a new optimal phase period may be chosen in the ensuing test period.

A signal on line 165 from the high state of flip-flop 392 in the transmitter portion 345 indicative of a begin of test period will be used to enable gate 610, and reset flip-flop 615 to its low state, flip-flop 565, decade counter 640, phase counter 650, and a flip-flop 670 to its low state all in the receiver portion 390. Likewise a signal on line 395 from the low state of the same flip-flop 392 in the transmitter portion 345 indicative of an end of test period will be used to reset binary counter 640 in the receiver portion 390. The flip-flop 670 upon being triggered by a signal on line 655 indicating the end of the test period will proceed to its high state to thus output a signal on line 675. The flip-flop 670 provides a slight delay in subsequent resetting as will be seen infra. The signal on line 675 is then sent to a NAND gate 680. A signal on line 600 from the low state of flip-flop 565 indicating that no new phase time is being initiated is also sent to be inputted to gate 680. Upon concurrent receipt of signals at its inputs, indicating the end of the test period, gate 680 will output a signal on line 400 to reset flip-flop 392 in the transmitter portion 345 to its low state to thus output a signal on line 395 that will, in turn, be used for delayably resetting the binary counter 625 in the receiver portion 390 as mentioned supra.

It will be noted that during a test period, the leading edges of the on 325 and off portions of charged and uncharged droplets 68 respectively for a given cycle 320 will define a line of 18° relative to the path of the uncharged droplets 68 towards the catcher 95. Likewise, the wall having the MIC 135 embedded therein in the mouth of the catcher 95 will form a line of 15° to thus be relatively parallel to the 18° line. These two lines will thus approximately mesh at the time when contact with the MIC 135 is made thereby allowing the charged and uncharged droplets 68 to begin and end striking the catcher 95 almost simultaneously. As such, a temporally subsequent sharply differentiated pseudo off-portion of the cycle 310 will be effectively created where no droplets 68 will hit the catcher 95 and thus MIC 135. This will act to enhance the ability of the MIC 135 to respond within its level to the targeted charged droplets 68, by as noted supra, temporally combining the off-portion into the on-portion 325 of the cycle 310 followed by a pseudo off-portion.

What is claimed is:

1. A device for optimally charging ink droplets for subsequent improved use in providing non-impact printing, comprising:

a. ink jet droplet means for spatially jetting out a stream of ink, transducing the stream into droplets, charging the droplets in a dynamically controlled manner as they are formed, and statically deflecting the charged droplets to describe characters on a surface to be printed; and b. phase correction means for test charging selected droplets, as they are formed in said ink jet droplet means, clocking through a plurality of discrete relatively narrow serially related phase time signals temporally varying out from and relative to the initializing of the transducing of the droplets, for quantitatively measuring the test charged droplets, as received at a predetermined sensing point in said ink jet droplet means for a given phase time being tested, for evaluating each tested phase time relative to all other tested phase times to determine which phase time provides the largest quantitative measure of droplet charge, and for controlling the charging of droplets in timed relation to the transducing of droplets with a phase relationship corresponding to the tested phase time providing maximum droplet charge.

2. A unit for charging droplets of ink in an optimal manner to provide improved non-impact printing using such droplets, comprising:

a. issuing means for spatially issuing a stream of ink;

b. transducer means for transducing the stream from said issuing means into droplets;

c. charging means for clockably charging in a dynamically controlled manner the droplets during the process of formation as initiated by said transducer means;

d. deflecting means for statically deflecting charged droplets from said charging means to describe characters on a surface to be printed; and e. phase correction means for test charging through said charging means selected droplets, as they are formed, clocking through a plurality of discrete phase times temporally varying out from and relative to the initializing of said transducer means, for quantitatively measuring the test charged droplet as received at a predetermined point that is proximate to the surface to be printed for a given time being tested, for evaluating each testing phase time relative to all other tested phase times to determine which phase time provides the largest quantitative measure of droplet charge, and for controlling the charging of droplets in timed relation to the transducing of droplets with a phase relationship corresponding to the tested phase time providing maximum droplet charge.

3. A system for charging droplets of ink in an optimal manner for improved use in subsequent non-impact printing comprising:

a. ink jet droplet means for spatially jetting out a stream of ink, transducing the stream into droplets, clockably charging the droplets in a dynamically controlled manner as they are formed, and statically deflecting the charged droplets to describe characters on a surface to be printed;

b. transmitter means for test charging selected droplets as they are formed in said ink jet droplet means, clocking through a plurality of discrete phase times temporally varying relative to the initializing of the transducing of the droplets; and c. receiver means for quantitatively measuring the charge on droplets that have been set up to be test charged by said transmitter means, as received at a predetermined sensing point in said ink jet droplet means for a given phase time being tested, for evaluating each tested phase time relative to all other tested phase times to determine which phase time provides the largest quantitative measure of droplet charge, and for controlling the charging of droplets in timed relation to the transducing of droplets with a phase relationship corresponding to the tested phase time providing maximum droplet charge.

4. An apparatus for placing a charge on ink droplets for improved use in subsequent non-impact printing, comprising:

a. emitting means for spatially emitting a stream of ink;

b. transducer means for transducing the stream from said emitting means into droplets;

c. charging means for clockably charging the droplets in a dynamically controlled manner during the process of formation as initiated by said transducer means;

d. deflecting means for statically deflecting charged droplets from said charging means to describe characters on a surface to be printed;

e. transmitter means for test charging selected droplets, as they are formed clockably through a plurality of discrete phase times temporally varying out from and relative to the initialization of said transducer means; and f. receiver means for quantitatively measuring the charge on droplets that have been set up to be test charged by said transmitter means, as received at a predetermined sensing point that is proximate to the surface to be printed for a given phase time being tested, for evaluating each tested phase time relative to all other tested phase times to determine which phase time provides the largest quantitative measure of droplet charge, and for controlling the charging of droplets in timed relation to the transducing of droplets with a phase relationship corresponding to the tested phase time providing maximum droplet charge.

5. In a mechanism for placing on a droplet of ink a charge for subsequent use in non-impact printing including an ink jet for spatially emitting a stream of ink, a transducer for vibrating the stream from the ink jet into droplets, charging plates for clockably charging the droplets in a dynamically controlled manner during the process of formation as initiated by the transducer, deflection plates for statically deflecting droplets charged by the charging plates to describe characters on a surface to be printed, a print logic circuit for controlling the deflection plates and charging plates, and a master clock for clocking the transducer and the charging plates, an improved phase correction system for calibrating the initiation of charging by the charging plates comprising:

1. transmitter means for test charging selected droplets by the charging plates, as they are formed, through a plurality of discrete phase times from the master clock temporally varying out from and relative to the initialization of the transducer, said transducer means being further defined to include, a. means for resetting and starting in real time said transmitter means and in delay time said receiver means;

b. means for counting the current phase times being tested once enabled by said resetting and starting means and triggered by a given phase time from the clock signal of the master clock, for outputting a coded signal representative of that phase time, and for outputting a modulating signal representative of that phase time;

c. means for selecting the phase time from the clock signal of the master clock as codably directed by said phase counter means representative of the current phase time being counted and for outputting that selected phase time; and d. first AND gating means for outputting during testing to the charging plates when a modulation signal from said phase counter means and a selected phase time from said selector means is concurrently received; and 2. receiver means for measuring the droplets that have been set up to be test charged by said transmitter means, as received at a predetermined sensing point that is proximate to the surface to be printed for a given phase time being tested, to evaluate the tested phase time indicating the maximum charge on a droplet for subsequent corrective use by the print logic circuit as the optimal phase time in charging the droplets during printing.

6. In an improved mechanism as described in claim 5 wherein said phase counter means comprises:

a. first flip flop means triggered by a given phase time in the clock signal of the master clock for outputting a signal having a period double that of a clock signal of the master clock;

b. binary counter means clocked by a signal from said first flip flop means for outputting a signal having a period that is a multiple of that outputted by said first flip flop means and for outputting to said first gating means as the modulation signal;

c. decade counter means clocked by a signal from said binary counter means for outputting a signal having a period that is a multiple of that outputted by said binary counter means and indicative of a new phase time being tested; and d. phase time counter means clocked by a signal from said decade counter means for serially outputting a signal having a period that is a multiple of that outputted by said decade counter means to disenable said resetting-starting means at the end of a test period, and for parallelly outputting a coded signal representative of the current phase time being tested to direct said selector means.

7. In an improved mechanism as described in claim 6 wherein the period multiple of said binary counter means is sixteen.

8. In an improved mechanism as described in claim 6 wherein the period multiple of said decade counter means is ten.

9. In an improved mechanism as described in claim 6 wherein the period multiple of said phase time counter means is ten.

10. In an improved mechanism as described in claim 5 wherein said resetting-starting means comprises:

a. OR gating means for outputting a signal upon receipt of signals either from the print logic circuit indicating the beginning of a test period or said phase counter means indicating the end of a test;

b. second flip flop means for outputting a signal at the beginning of the test period to reset said phase counter means and for outputting a signal at the end of test period to abort said phase counter means from outputting a modulation signal to said first AND gating means;

c. monostable means triggered on by said second flip flop means at the beginning of a test period for delayably initializing said receiver means;

d. third flip flop means for outputting a signal at the beginning of a test period after said monostable means has timed out to delayably reset said receiver means, and for being reset by a signal from said receiver means in order to output a signal at the end of test period that will synchronously abort in said receiver means timing analogous to the modulation signal outputted by said phase counter means;

e. second AND gating means for outputting a signal upon receipt of a pair of signals from said phase counter means indicating the beginning of test period or immediately thereafter;

f. third AND gating means for outputting a signal upon receipt of signal from said second AND gating means and after said monostable means has timed out, to cooperate with the time on signal of said monostable means to initialize said receiver means at the beginning of a test period.

11. In a mechanism for placing on a droplet of ink a charge for subsequent use in non-impact printing including an ink jet for spatially emitting a stream of ink, a transducer for vibrating the stream from the ink jet into droplets, charging plates for clockably charging the droplets in a dynamically controlled manner during the process of formation as initiated by the transducer, deflection plates for statically deflecting droplets charged by the charging plates to describe characters on a surface to be printed, a print logic circuit for controlling the deflection plates and charging plates, and a master clock for clocking the transducer and the charging plates, an improved phase correction system for calibrating the initiation of charging by the charging plates comprising:

1. transmitter means for test charging selected droplets by the charging plates, as they are formed, through a plurality of discrete phase times from the master clock temporally varying out from and relative to the initialization of the transducer; and 2. receiver means for measuring the droplets that have been set up to be test charged by said transmitter means, as received at a predetermined sensing point that is proximate to the surface to be printed for a given phase time being tested, to evaluate the tested phase time indicating the maximum charge on a droplet for subsequent corrective use by the print logic circuit as the optimal phase time in charging the droplets during printing, said receiver means being defined to include, a. sensing means for identifying at the predetermined sensing point a charged droplet representative of a phase time being tested and for digitizing the representative phase time;

b. first and second store means for separately storing during a test period a representation of the currently identified phase time and the previously identified maximum phase time respectively, and for comparing the two stored phase times and outputting a signal when the currently identified phase time is greater than the previously identified maximum phase time;

c. means for loading the currently identified phase time in said first store means into said second store means when said compare means outputs, and for subsequently clearing said first store means once said compare means has made a compare; and d. means for countably storing the current phase time when triggered by a given phase time in a clock signal from the master clock and enabled by said transmitter means, for receivably storing the currently maximum counter signal from said phase counter means when enabled by a compare signal from said compare means indicating the currently maximum phase time, and for selecting the phase time from all the phase times of the clock of the master clock as codably directed by said maximum count store means to thereby be outputted therefrom at the end of the test period as the optimal phase time to the print logic circuit for correcting the temporal initializing of the charging plates during printing.

12. In an improved mechanism as described in claim 11 wherein said sensing means is a microphone.

13. In an improved mechanism as described in claim 11 wherein said digitizing means is an analog to digital converter.

14. In an improved mechanism as described in claim 11 wherein said first and second store means further comprises first OR means for interposably detouring signals from said first store means to said second store means through said first OR means and for alternatively receiving initializing signals from said transmitter means to likewise be sent to said second store means at the beginning of a test period to immunize said second store means from spurious compares caused by noise being received from said first store means.

15. In an improved mechanism as described in claim 11 wherein said phase counter means comprises:

a. first AND gating means for outputting a signal upon receipt of a given phase time in the clock signal of the master clock and a reset signal indicating the beginning and continuation of a test period;

b. first flip flop means triggered by a signal from said first AND gating means for outputting a signal having a period double that of a clock signal of the master clock;

c. binary counter means clocked by a signal from said first flip flop means for outputting a signal having a period that is a multiple of that outputted by said first flip flop means;

d. decade counter means clocked by a signal from said binary counter means for outputting a signal having a period that is a multiple of that outputted by said binary counter means and indicative of a new phase time being tested; and e. phase time counter means clocked by a signal from said decade counter means for serially outputting an end of test of period signal having a period that is a multiple of that outputted by said decade counter means and for parallelly outputting a coded signal representative of the current phase time being tested to direct said selector means.

16. In an improved mechanism as described in claim 14 wherein the period multiple of said binary counter means is sixteen.

17. In an improved mechanism as described in claim 14 wherein the period multiple of said decade counter means is ten.

18. In an improved mechanism as described in claim 14 wherein the period multiple of said phase time counter means is ten.

19. In an improved mechanism as described in claim 14 wherein said phase counter means further comprises:

a. second flip flop means for being triggered by the serial output of said phase time counter at the end of a test period to delayably output a signal indicative thereof and for being operative to reset by a signal from said transmitter means at the beginning of a test period; and b. second AND gating means for outputting a signal to said transmitter means indicating the end of a test period upon receipt of signals from said second flip flop means indicating end of test period and said load/clear means indicating a clear is taking place.

20. In an improved mechanism as described in claim 11 wherein said load/clear means further comprises third AND gating means for outputting a signal enabling said phase counter means to parallel input to said maximum count store means upon receipt of a given phase time of the clock signal from the master clock and a signal from said compare means.

21. In an improved mechanism as described in claim 19 wherein said load/clear means further comprises second OR gating means for outputting a signal to said second store means to enable it to receive a signal from said first store means upon receipt of a signal from said third AND gating means or an initializing signal from said transmitter means.

22. In an improved mechanism as described in claim 20 wherein said load/clear means further comprises third OR gating means for outputting a signal indicating a new phase time is to be tested upon receipt of a signal from said phase counter means.

23. In an improved mechanism as described in claim 21 wherein said load/clear means further comprises third flip flop means for outputting a signal indicating the start of a test of a new phase time upon triggerable receipt of a signal from said phase counter means through said third OR gating means, and for outputting a signal, upon being reset by a signal from said transmitter means indicating the end of a test period, to said phase counter means to allow it to output a signal to said transmitter means indicating an end of test period.

24. In an improved mechanism as described in claim 22 wherein said load/clear means further comprises fourth AND gating means for outputting a signal through said third OR gating means to trigger said third flip flop means to output a signal indicating a period just after the beginning of a new phase time being tested upon receipt of a given phase time signal of the clock signal from the master clock and a signal from said third flip flop means indicating the beginning of a new phase time being tested.

25. In an improved mechanism as described in claim 23 wherein said load/clear means further comprises fifth AND gating means for outputting a signal indicating a new phase time is being tested upon receipt of a signal from said phase counter means indicating the occurrence of a given phase time of the clock signal from the master clock and a signal from said third flip flop means indicating the start of a new phase time being tested.

26. In an improved mechanism as described in claim 24 wherein said load/clear means further comprises third OR gating means for outputting a signal to said first store to enable it to receive a new phase time signal upon receipt of either a signal from said fifth AND gating means indicating a time just after the start of a test of a new phase time or an initializing signal from said transmitter means indicating the beginning of a new test period.

27. In an assembly for charging in an optimal manner an ink droplet for subsequent use in non-impact printing including an ink jet for spatially emitting a stream of ink, a transducer for transducing the stream from the ink jet into droplets, charging plates for clockably charging the droplets in a dynamically controlled manner during the process of formation as initiated by the transducer, deflection plates for statically deflecting droplets charged by the charging plates to describe characters on a surface to be printed, a print logic circuit for controlling the deflection plates and charging plates, and a master clock for clocking the transducer and the charging plates, an improved phase correction system for calibrating the initiation of droplet charging, comprising:

means for receiving a plurality of discrete phase times that are subdivisions of a clock signal from the master clock, means for selecting one of the discrete phase times to be grouped with like phase times from a plurality of clock signals, means for placing test charges on droplets traversing the charging plates, means for quantitatively measuring droplet charge at a sensing point proximate the printing surface and having a response level equal to the phase time grouping frequency, means for accumulatably storing as cycles the sensed phase time groupings, means for stepping through all the discrete phase times in a like manner to ascertain the optimal phase time therefrom depending on the maximum accumulated cycles of each, and means for directing the optimal phase time to the print logic circuit at the end of the test period to vary the temporal initializing of the charging plates accordingly during the subsequent print period.

28. An improved method for optimally charging ink droplets for subsequent improved use in providing non-impact printing, comprising the steps of:

a. jetting spatially out a stream of ink, transducing the stream into droplets, charging clockably the droplets in a dynamically controlled manner as they are formed, and deflecting statically the charged droplets to describe characters on a surface to be printed; and b. testing by charging selected droplets, as they are formed, clocking through a plurality of discrete phase times temporally varying out from and relative to the initializing of the transducing of the droplets, and quantitatively measuring the test charges, as received at a predetermined sensing point for a given phase time being tested, evaluating each tested phase time relative to all other tested phase times to determine which phase time provides the largest quantitative measure of droplet charge, and regulating the charging of droplets in timed relation to the transducing of droplets with a phase relationship therebetween corresponding to the tested phase time providing maximum droplet charge.

29. An improved method for charging droplets of ink in an optimal manner to provide improved non-impact printing using such droplets, comprising the steps of:

a. issuing spatially a stream of ink;

b. transducing the issued stream of ink into droplets;

c. charging clockably the droplets in a dynamically controlled manner during the process of formation as initiated by the transducing;

d. deflecting statically charged droplets to describe characters on a surface to be printed; and e. testing by charging selected droplets, as they are formed, clocking through a plurality of discrete phase times temporally varying out from and relative to the initializing of transducing, and quantitatively measuring the charge on test droplets, as received at a predetermined sensing point that is proximate to the surface to be printed for a given phase time being tested, evaluating each tested phase time relative to all other tested phase times to determine which phase time provides the largest quantitative measure of droplet charge, and regulating the charging of droplets in timed relation to the transducing of droplets with a phase relationship therebetween corresponding to the phase time providing maximum droplet charge.

30. An improved method for charging droplets of ink in an optimal manner for improved use in subsequent non-impact printing, comprising the steps of:

a. jetting spatially out a stream of ink, transducing the stream into droplets, charging clockably the droplets in a dynamically controlled manner as they are formed, and deflecting statically the charged droplets to describe characters on a surface to be printed;

b. transmitting test charges to selected droplets as they are formed, clocking through a plurality of discrete phase times temporally varying relative to the initializing of the transducing of the droplets; and c. receiving the droplets that have been set up to be test charged at a predetermined sensing point and quantitatively measuring the charge on the droplets for the given phase time being tested, evaluating each tested phase time relative to all other tested phase times to determine which phase time provides the largest quantitative measure of droplet charge, and regulating the charging of droplets in timed relation to the transducing of droplets with a phase relationship therebetween corresponding to the phase time providing maximum droplet charge.

31. An improved method for placing a charge on ink droplets for improved use in subsequent non-impact printing, comprising the steps of:

a. emitting spatially a stream of ink;

transducing the emitter stream into droplets;

c. charging clockably the droplets in a dynamically controlled manner during the process of formation as initiated by transducing;

d. deflecting statically charged droplets to describe characters on a surface to be printed;

e. transmitting charges to selected droplets for testing, as they are formed clockably through a plurality of discrete phase times temporally varying out from and relative to the initializing of transducing; and f. receiving for quantitative measuring the droplets that have been set up to be test charged as received at a predetermined sensing point that is proximate to the surface to be printed for a given phase time being tested, evaluating each tested phase time relative to all other tested phase times to determine which phase time provides the largest quantitative measure of droplet charge, and regulating the charging of droplets in timed relation to the transducing of droplets with a phase relationship therebetween corresponding to the time phase providing maximum droplet charge.

32. In an improved method for placing on a droplet of ink a charge for subsequent use in non-impact printing including an ink jet for spatially emitting a stream of ink, transducer means for transducing the stream from the ink jet into droplets, charging plates for clockably charging the droplets in a dynamically controlled manner during the process of formation as initiated by the transducer, deflection plates for statically deflecting droplets charged by the charging plates to describe characters on a surface to be printed, a print logic circuit for controlling the deflection plates and charging plates, and a master clock for clocking the transducer and the charging plates, an improved phase correction system for calibrating the initiation of charging by the charging plates comprising the steps of:

a. testing selected droplets to be charged, as they are formed, through a plurality of discrete phase times temporally varying out from and relative to the initialization of transducing; and b. quantitatively measuring the charge on the droplets that have been set up to be charged as received at a predetermined sensing point that is proximate to the surface to be printed for a given phase time being tested, evaluating each tested phase time relative to all other tested phase times to determine which phase time provides the largest quantitative measure of droplet charge, and regulating the charging of droplets in timed relation to the transducing of droplets with a phase relationship therebetween corresponding to the time phase providing maximum droplet charge.

33. An ink jet printer comprising:

ink jet means for emitting a continuous stream of ink;

droplet inducer means for inducing the continuous ink stream to form into a plurality of discrete ink droplets;

droplet charge means for electrically charging an ink droplet in timed relation to its induction by the droplet inducer means;

deflection means for deflecting a charged ink droplet onto a recording medium; and phase correction means for correcting the phase of the timed relationship between the droplet inducer means and the droplet charge means, the phase correction means being defined to include, transmitter means for energizing during a test period the droplet charge means through a plurality of discrete phase times relative to and representing divisions of the time interval between droplet formation, droplet charge measuring means for providing a quantitized measure of the charge on a droplet charged at each of the discrete phase times of the transmitter means, receiver and comparator means for receiving the quantitized measure of the charge on a droplet charged at each phase time and comparing its magnitude with the quantitized measure of droplet charge for droplets charged at the other phase times of the transmitter means and determining which phase time yields the maximum measure of droplet charge, and control means responsive to the determination of the time phase yielding maximum droplet charge for controlling subsequent to the test period the timed relation between the droplet induction means and the droplet charge means at the maximum phase time.

34. The ink jet printer as defined in claim 33 wherein the droplet charge measuring means includes an electromechanical transducer responsive to a mechanical stimulus imparted by the charged droplet to produce and output an analog electrical signal of magnitude corresponding to the degree of mechanical stimulus.

35. The ink jet printer as defined in claim 34 wherein the electromechanical transducer is a microphone.

36. A method for calibrating the timed relation between the inducing of droplets and the charging of induced droplets in an ink jet printing system, comprising the steps of:

inducing the formation of droplets from an emitted ink stream at a predetermined clock frequency having a period T;

test charging ink droplets so formed through a plurality of discrete time phases relative to and representing subdivisions of the period T;

quantitatively measuring the charge on the ink droplets with respect to each of the time phases and comparing to determine which time phase provides the greatest measure of charge; and regulating during a subsequent print period the timed relation between the inducing of droplets and the charging of induced droplets at the time phase which was determined to provide the greatest measure of charge.

* * * * *